US007752563B2

(12) United States Patent
Ice et al.

(10) Patent No.: US 7,752,563 B2
(45) Date of Patent: Jul. 6, 2010

(54) ENABLING A USER TO SELECT MULTIPLE OBJECTS IN A DOCUMENT

(75) Inventors: Cynthia L. Ice, Maynard, MA (US); Ming Fei Jia, Beijing (CN); Xing Li, Bei Jing (CN); Richard Scott Schwerdtfeger, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 11/740,449

(22) Filed: Apr. 26, 2007

(65) Prior Publication Data

US 2008/0040686 A1    Feb. 14, 2008

(30) Foreign Application Priority Data

Apr. 30, 2006    (CN)    .................... 2006 1 0076541

(51) Int. Cl.
*G06F 3/00*    (2006.01)
*G06F 3/048*    (2006.01)
(52) U.S. Cl. ....................... 715/765; 715/810; 715/854; 345/168
(58) Field of Classification Search ................. 715/764, 715/765, 769, 781, 810, 835, 846, 853, 854, 715/856; 345/156, 160, 168
See application file for complete search history.

(56) References Cited

U.S. PATENT DOCUMENTS

| 4,703,321 | A | 10/1987 | Barker et al. |
| 5,600,778 | A | 2/1997 | Swanson et al. |
| 6,426,761 | B1 | 7/2002 | Kanevsky et al. |
| 6,931,532 | B1 | 8/2005 | Davis et al. |
| 2003/0007014 | A1* | 1/2003 | Suppan et al. ............... 345/853 |
| 2003/0197744 | A1* | 10/2003 | Irvine ......................... 345/856 |
| 2004/0135815 | A1* | 7/2004 | Browne et al. .............. 345/810 |

* cited by examiner

*Primary Examiner*—X. L Bautista
(74) *Attorney, Agent, or Firm*—Lee Law, PLLC; Christopher B. Lee

(57) ABSTRACT

A user is enabled to select multiple objects in a document which is opened in an editor and contains selectable objects by presenting each of the objects as an entry of plurality of entries in a separate window; allowing the user to select multiple entries; and selecting multiple objects corresponding to the selected multiple entries in the editor based on the entries selected by the user. An Assistive Technology application may be called to provide related information and selection state of the operated object based on a user's operation on any one of the entries. The multiple objects can be selected in the document with a keyboard to help disabled users, such as low vision users or blind users.

23 Claims, 10 Drawing Sheets

ENABLING A USER TO SELECT MULTIPLE OBJECTS IN A DOCUMENT

FIELD OF THE INVENTION

The present invention relates to information processing technology, and especially to methods and apparatus for enabling a user to select multiple objects in a document.

BACKGROUND

In various existing editors, there are many kinds of objects, such as headings, graphics, charts, drawing objects (for example, circles, rectangles, ellipses, lines, etc. in Microsoft Office, they are also named Auto Shapes), hyperlinks, OLE objects and so on. These objects can present rich document information to users.

A user who edits a document in an editor often needs to select one or more objects in the document to perform various functions on them. For instance, when the user selects an object, he or she can perform operations like deleting, duplicating, moving, resizing and editing on it. In many cases, the user wishes to select a group of objects and perform the same function on them simultaneously. In most existing graphic operating system and applications, a group of objects can be selected mainly in the following four ways.

The first method is that the user is allowed to click on a first object by using mouse, and then hold down the SHIFT or Ctrl key while clicking on another object. By such operations, the user can select more than one object.

The second method is that the user is allowed to select a group of adjacent objects by dragging mouse to form a rectangle selection box around the desired objects. Depending on the parameters of the specific program, the selected objects will include those that are contained entirely within the rectangle selection box or those that intersect the rectangle selection box.

The third method is that the user holds down the SHIFT key while using ARROW keys to move selection cursor. Thus, the objects in the selection region formed by the movement of the selection cursor are selected.

The forth method can provide two types of selection mark different in color or shape, which represent navigation mark and selection mark respectively. If the user selects only one object, the navigation mark is the same as the selection mark. When the user switches the operation focus to another object by pressing TAB key, the navigation mark is switched to this object too, but the selection mark keeps unmoved. When the user moves the operation focus to the desired object, he/she can press SHIFT and ENTER keys together to do the selection. Then the current selected objects will include the first object and the desired object. Another implementation of this method is to utilize the combination of CTRL, SHIFT, TAB, SPACE and ENTER keys to switch the navigation mark and the selection mark separately, and finish the selection after a series of complex keyboard operations.

When a disabled user uses the software, he or she usually needs Assistive Technology (AT) tools to obtain the information, which requires the software can be accessible. Software accessibility requires that all the User Interface (UI) elements should be accessed not only by mouse but also by keyboard only. By using the keyboard, such as TAB key, ARROW keys, function keys, etc., those disabled users, especially blind or low-vision users, can precisely navigate to the element in the document and then the AT tools can present the elements to the users.

Therefore, the above first, second and third methods are not compliant with the software accessibility requirements entirely. The first two methods must depend on the mouse, and thus the two methods are not compliant with the software accessibility requirements for disabled users, such as blind or low-vision users. The third method can only do the continuous selection although only keyboard is used. Moreover, the method depends on the text cursor and is only applied when the text cursor exists. Some objects which cannot be reached by the text cursor cannot be selected by this method. In some editors, the method can only select the texts and some graphics, but not all the objects. Since the third method cannot be applied to all the objects, it cannot be regarded as an effective method for selecting multiple objects.

Although the fourth method can use only keyboard to select multiple objects continuously or non-continuously, the operation is too complex. Moreover, this method has known shortcomings of its own.

Therefore, there is a need for a method for enabling the user to select multiple objects in a document by using keyboard only, which can be applied to most applications.

SUMMARY

The present invention is proposed based on the above technical problems, the object of which is to provide a method and apparatus for enabling a user to select multiple objects in a document to provide users, especially disabled users, with selection of the multiple objects with keyboard operations only, and the operations are easy to perform.

According to one aspect of the present invention, it is provided with a method for enabling a user to select multiple objects in a document which is opened in an editor and contains a plurality of selectable objects, the method comprising: presenting each of the plurality of selectable objects as an entry of a plurality of entries in a separate window; allowing the user to select multiple entries from the plurality of entries; and selecting multiple objects corresponding to the selected multiple entries in the editor based on the multiple entries selected by the user.

Preferably, the step of allowing the user to select multiple entries from the plurality of entries includes: setting a control having a function of indicating a selection state for each of the plurality of entries; allowing the user to use navigation keys and a selection key to traverse each of the plurality of entries and select the control of each of the plurality of entries. Preferably, each of the plurality of entries further includes related information of the corresponding selectable object.

Preferably, the method further comprises: based on a user's operation on any one of the plurality of entries, calling an Assistive Technology (AT) application to provide the user with the related information and the selection state of the operated object. Preferably, the user's operation is performed with keyboard. Preferably, the related information of the object is accessibility information of the object.

According to another aspect of the present invention, it is provided with an apparatus for enabling a user to select multiple objects in a document which is opened in an editor and contains a plurality of selectable objects, the apparatus including; a navigation window, for presenting each of the plurality of selectable objects as an entry of a plurality of entries and allowing the user to select multiple entries from the plurality of entries; and a selecting unit, for selecting multiple objects corresponding to the selected multiple entries in the editor based on the selection of the multiple entries from the plurality of entries by the user.

Preferably, each entry corresponding to each of the plurality of selectable objects in the navigation window includes: a control having a function of indicating a selection state of the entry, for allowing the user to select. Preferably, each entry corresponding to each of the plurality of selectable objects in the navigation window further includes: related information of the corresponding selectable object.

Preferably, the apparatus further comprises: an assistive technology unit, for providing the related information and the selection state of the operated object to the user in a manner provided by Assistive Technology (AT) based on a user's operation in the navigation window.

According to still another aspect of the present invention, it is provided with an apparatus for editing an electronic document, comprising an apparatus for enabling a user to select multiple objects in a document and the editor.

BRIEF DESCRIPTION OF THE DRAWINGS

The invention may be best understood with reference to the accompanying drawings, wherein.

DETAILED DESCRIPTION

Figure 1:
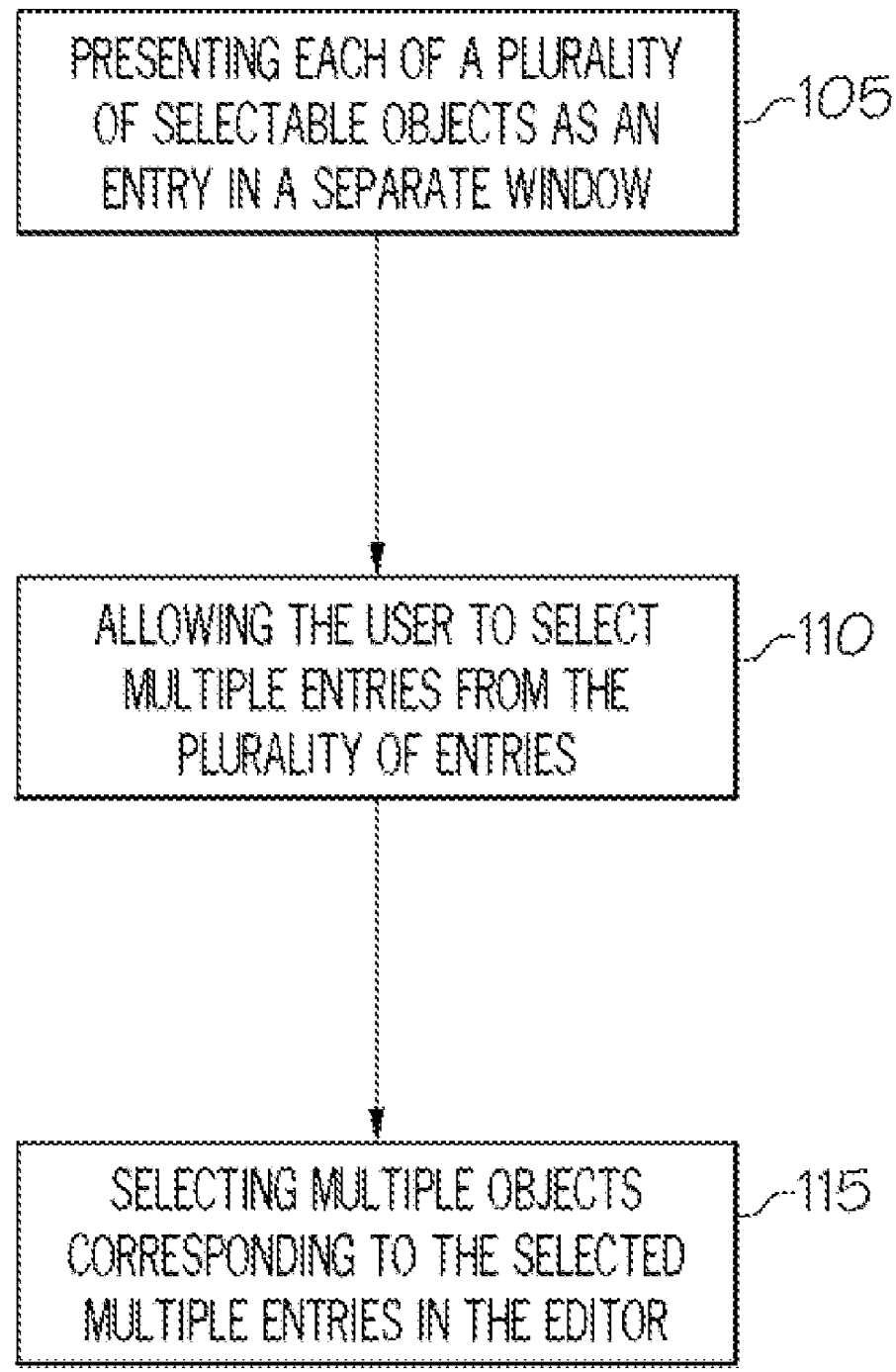
FIG. 1 is a flowchart of a method for enabling a user to select multiple objects in a document according to one embodiment of the present invention.

FIG. 1 is a flowchart of a method for enabling a user to select multiple objects in a document according to one embodiment of the present invention, wherein the document is opened in an editor and contains a plurality of selectable objects. In the embodiment, the editor may be any kind of hierarchical multi-format electronic document editor, which contains many types of objects, such as headings, tables, graphics, hyperlinks, OLE objects, drawing objects, etc. The common-used editors include word processing editor like Microsoft Word, spreadsheet editor like Microsoft Excel, and presentation editor like Microsoft PowerPoint. Object is a relatively independent document element, which realizes a special function and has its own properties and behaviors.

Next, the embodiment of the method for enabling a user to select multiple objects in a document is described in detail accompanying with FIG. 1.

As shown in FIG. 1, in step 105, each of the plurality of selectable objects in a document opened in the editor is presented as an entry of a plurality of entries in a separate window. The selectable objects can be charts, rectangles, ellipses, lines, for example, which exist in different locations in the document.

When the plurality of selectable objects is presented in the window, the plurality of selectable objects can be presented in the form of a list. In the list, the plurality of selectable objects is arranged in name or location. Certainly, if should be understood for the persons skilled in the art that the plurality of selectable objects can also be arranged in other order.

Moreover, when the plurality of selectable objects is presented in the window, the plurality of selectable objects in the document is categorized at first, and then they are presented in a tree structure, in which each category is a branch node of the tree structure and each object is a leaf node. As a result, the tree structure comprises two layers, wherein a first layer (branch node) is the category of the selectable object and a second layer (leaf node) is the selectable object.

The categorization of the selectable objects can be based on the type of the object, such as charts, drawing objects, the location of the object such as the first five pages of the document, or other categorization criteria defined by the user.

Moreover, the plurality of selectable objects can be categorized many times, i.e. they are categorized according to more than one categorization criterion, so that the tree structure having a multi-layer is obtained. For example, firstly the selectable objects are primarily categorized based on the categorization criterion defined by the user, and then the primarily categorized objects are further categorized based on the type of the object, thus the plurality of selectable objects can be presented in a tree structure with three layers, wherein the first and second layers (branch nodes) are the category defined by the user and the type respectively, and the third layer (leaf node) is the selectable object.

In the embodiment, it is preferred to present the selectable objects by using the tree structure. It can be understood that presenting the selectable objects in the list or the tree structure as described above is illustrative, and other forms can also be applied for persons skilled in the art.

Furthermore, before the selectable objects are presented, the plurality of selectable objects is extracted from the document (step 101).

Next, in step 110, the user is allowed to select multiple entries from the plurality of entries. Specifically, a control having a function of indicating a selection state of the entry is set for each entry. Preferably, the control is a Check Box. It is possible for the user to select the entry by setting the control such as the Check Box. Checked or unchecked of the Check Box can be used to indicate the selection state of each entry, i.e. "selected" or "unselected".

Then, the user is allowed to use navigation keys and a selection key to traverse each entry and select the control of the entry, such as the Check Box. The navigation keys are keys with which the user can move the operation focus among the entries, for example, ARROW keys. The selection key is a key with which the user can switch the selection state of the entry, for example, SPACE key. Of course, the persons skilled in the art should know that other keys can also be used as the navigation keys and the selection key.

Further, in the case that the plurality of selectable objects is presented in the tree structure, for each branch node of the tree structure, a control having a function of indicating selection state of all entries in the branch node can be set. For example, the control is a Check Box. As a result, Checked or unchecked of the Check Box can be used to indicate the selection state of all entries in each branch node, i.e. "selected" or "unselected". Then, the user is allowed to use the navigation keys and the selection key to traverse each branch node and select the control of each branch node, such as the Check Box. When the Check Box of a branch node is checked, all entries in the branch node are selected equivalently.

In practice, the user uses the navigation keys to move the operation focus among the entries and/or the branch nodes. When the operation focus is moved to the desired entry or the branch node, the user presses the selection key and then the Check Box of the entry or the branch node is checked. At that time, the selection state(s) of the entry or all entries in the branch node is indicated as "selected." Further, if the user wants to cancel the selected entry or branch node, he/she can move the operation focus to the selected entry or branch node and then presses the selection key, thus the Check Box of the entry or branch node is changed to be unchecked and the selection state(s) of the entry or all entries in the branch node is changed to "unselected".

Next, in step 115, multiple objects corresponding to the selected multiple entries are selected in the editor based on the multiple entries selected by the user. For the entry selected by the user, the corresponding object is selected in the editor by invoking corresponding "selected" function. Further, for the selected entry canceled by the user, the selection of the corresponding object, is removed by invoking corresponding "unselected" functions.

It can be seen from above description that the method for enabling a user to select multiple objects in a document can provide continuous or non-continuous selection of the multiple objects in the document by using keyboard to make the operation convenient for the users, especially for low-vision users or blind users. And compared with the existing methods for selecting multiple objects in the prior art, this method also simplify the operation of the user.

Further, in the embodiment, the method for enabling a user to select multiple objects in a document includes: when at least one of the plurality of selectable objects in the document is modified or deleted in the editor, updating the plurality of entries in the window in response to the change of the selectable objects in the editor.

In addition, when at least one selectable object is added in the editor, the above step 105 of presenting and/or step 101 of extracting are redone.

It can be seen from the above description that in the embodiment, the plurality of selectable objects can be updated in real time according to the change of the selectable objects in the editor to ensure the entries related to the objects in the window are newest.

Figure 2:
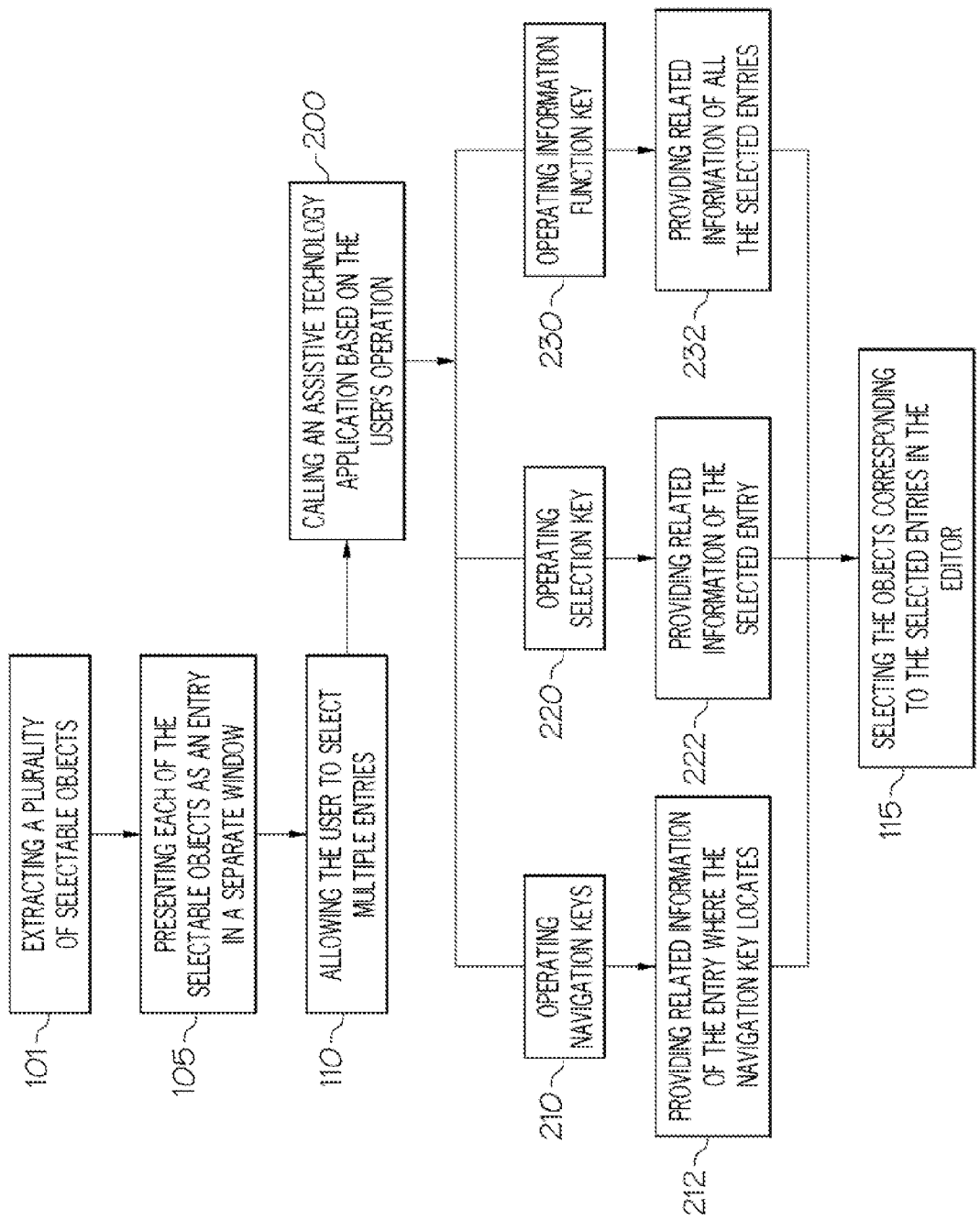
FIG. 2 is a flowchart of a method for enabling a user to select multiple objects in a document according to another embodiment of the present invention.

FIG. 2 is a flowchart of a method for enabling a user to select multiple objects in a document according to another embodiment of the present invention, wherein the same reference numerals are used in the portions that are the same as FIG. 1 and the description of the same portions are omitted properly. Comparing with the embodiment as shown in FIG. 1, in order to facilitate the use of the disabled users, such as the low-vision users or the blind users, the embodiment of the method for enabling the user to select multiple objects in a document further includes: according to a user's operation on any one of the plurality of entries in the window, an Assistive Technology (AT) application is called to provide the user with related information and the selection state of the operated object, as shown in step 200 of FIG. 2.

The entry of each selectable object presented in the window further includes the related information of the corresponding selectable object to provide the related information. The related information of the object is the information created by the editor during the edit of the electronic document or inputted by the user. In this embodiment, the related information is accessibility information of the object, including Name, Role, Description, State, Location, Value, etc. Certainly, it should be understood for persons skilled in the art that the related information of the object can also include other information.

In order to comply with the software accessibility, in the embodiment, the editor is accessible and each object has its accessibility information to be provided to the user by the Assistive Technology application. The common-used Assistive Technology application includes JAWS, Window-Eyes, Inspect32, etc.

In the following, the accessibility information of the object is explained briefly.

"Name" is a string used to identify an object. All objects should support the Name attribute. The Name attribute can be used as an identity of the object and help the user to identify the object.

"Role" is an attribute for describing the type that an object belongs to. All objects should support the Role attribute. The Role attribute can help the user to identity the object type.

"Description" is a textual description about an object's visual appearance or other information. This attribute is mainly used to provide more contexts to the low-vision or blind users.

"State" is an attribute for describing an object's state at a moment in time. All objects should support the State attribute. The State property can help the user to know the current state of the object.

"Location" provides current location of the object, for example, the current screen location of the object, the object's location in the document, etc. The Location attribute can provide the layout of the objects in the document to the user and help the user to locate the correct object quickly.

In the case that the related information is the accessibility information, if the selectable objects are presented in the tree structure and are only categorized based on the type of the object, the tree structure has two layers, wherein the first layer (branch node) is the type of the object which corresponds to the Role attribute in the accessibility information of the object and the second layer (leaf node) is the selectable object. The presented name of each leaf node corresponds to the Name attribute in the accessibility information of the object, in the attribute information of the leaf node, description corresponds to the Description attribute and the Location attribute in the accessibility information of the object and state corresponds to the State attribute in the accessibility information of the object.

As shown in FIG. 2, the user's operations on the plurality of entries in the window include three operations. Depending on the respective operations, the Assistive Technology application can be called to provide the related information and the selection state of the operated object to the user, which will be described in detail accompanying with FIG. 2.

In step 210, the user's operation is to use the navigation keys to traverse every entry and/or branch node in the window. When the user operates the navigation keys to move the operation focus to an entry or a branch node, in step 212, the Assistive Technology application is used to provide the user with the related information and the selection state(s) of the object(s) of the entry or all entries in the branch node. For example, the related information and the current selection state of the object are read out to the blind users. By this operation, the disabled users can know the related information and the current selection state(s) of the object(s) of the entry or all entries in the branch node where the operation focus locates, so that the user can determine whether the entry or the branch node is the user desired entry or branch node.

In step 220, the user's operation is to use the selection key to select an entry or a branch node. When an entry or a branch node is selected, in step 222, the Assistive Technology application is called to provide the user with the related information and the current selection state(s) of the object(s) of the selected entry or all entries in the selected branch node. By this operation, the disabled users can know the related information and the current selection state(s) of the object(s) of the currently selected entry or all entries in the currently selected branch node, so that the user can further determined whether the correct entry or branch node is selected.

Generally, if the user wants to know all the currently selected objects, he/she must use the navigation keys to traverse all entries to call the Assistive Technology application to know the related information and the selection states of all the objects. As a result, no matter whether it is the selected object, the Assistive Technology application must be called, which causes low efficiency. Moreover, in the case that the selected entries and the unselected entries are intersected, it is more difficult for the user to know all the currently selected objects.

To solve the problem, the embodiment also includes: calling the Assistive Technology application to provide the user with the related information and/or the select states of all the currently selected objects. In this case, the user's operation can be to operate a pre-defined information function key for example. Specifically, in step 230, the user's operation is to operate the information function key. When the information function key is pressed, in step 232, the Assistive Technology application is called to provide the user with the related information and/or the selection states of all the currently selected objects.

Further, the related information and/or the selection states of all the currently selected objects are presented in a Status Bar in the window. Thus, the Assistive Technology application can use its short-cut key to read out the information in the Status Bar. Preferably, only the names of the objects are presented in the Status Bar. In this case, all the names are formatted into a character string.

In the embodiment, the related information of the object is the accessibility information of the object. As described in the above, the related information of the object can also include other information besides the accessibility information of the object. In this case, the related information of the object needs to be mapped to the accessibility information of the object to facilitate the Assistive Technology application to access before the Assistive Technology application is called to provide the user with the related information and the selection states.

It can be seen from the above that the method for enabling a user to select multiple objects in a document integrates the Assistive Technology application to provide the related information of the objects to the disabled users and improve the efficiency of the method for selecting multiple objects in a document with keyboard. For example, the disabled users can locate the objects and track the states more easily and promptly. In addition, the embodiment, is also suitable for the case that the related information of the object includes other information but the accessibility information of the objects.

Figure 3:
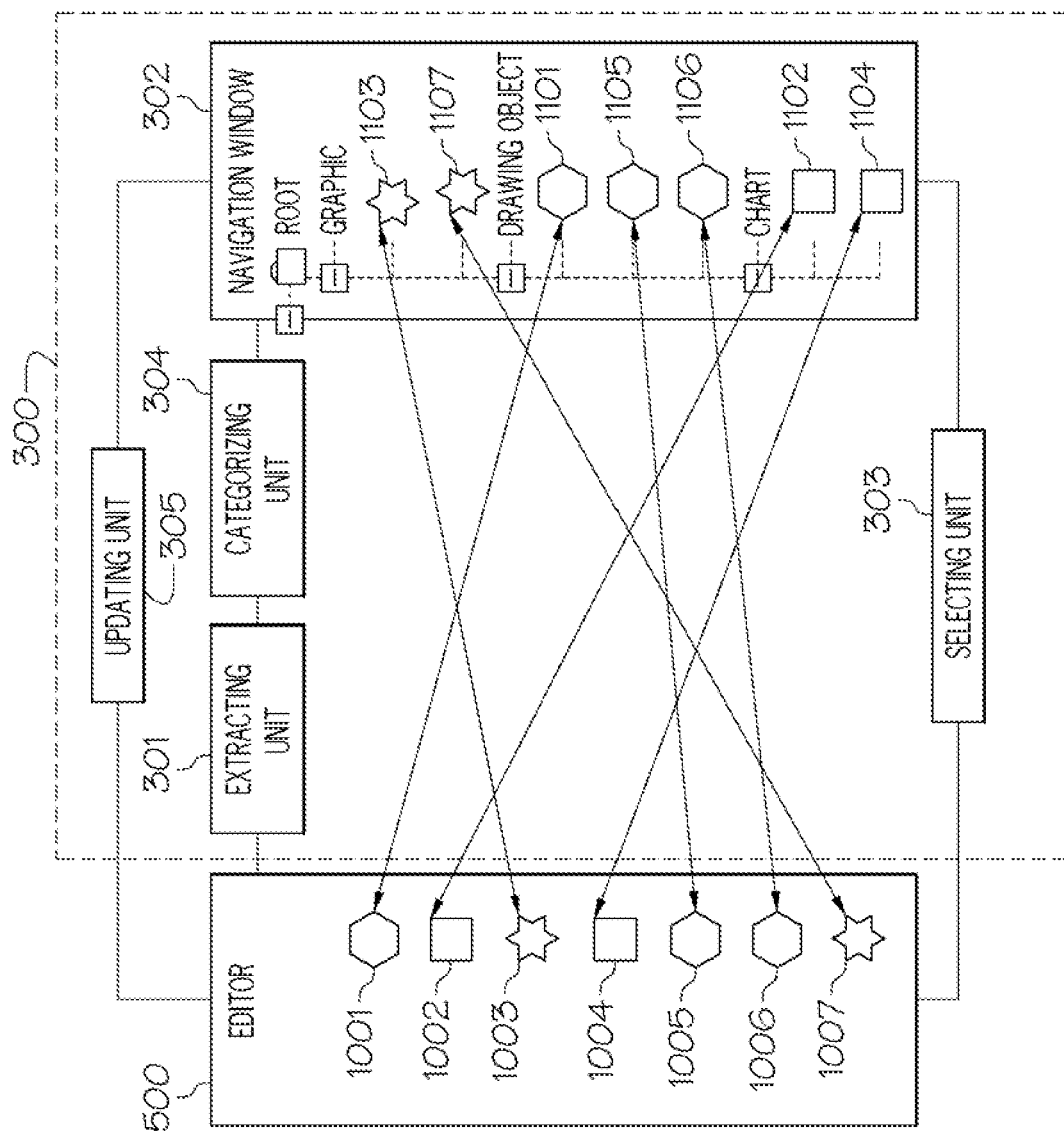
FIG. 3 is a schematic block diagram of an apparatus for editing an electronic document which includes an editor and an apparatus for enabling a user to select multiple objects in a document according to one embodiment of the present invention.

Under the same inventive concept, FIG. 3 is a schematic block diagram of an apparatus for editing an electronic document which includes an apparatus 300 for enabling a user to select multiple objects in a document according to one embodiment of the present invention and the editor 500, wherein the document is opened in the editor 500 and includes a plurality of selectable objects.

As shown in FIG. 3, the embodiment of the apparatus 300 for enabling a user to select multiple objects in a document includes: a navigation window 302 for presenting each of the plurality of selectable objects in the document as an entry of a plurality of entries and allowing the user to select multiple entries from the plurality of entries; a selecting unit 303 for selecting multiple objects corresponding to the selected multiple entries in the editor 500 based on the selection of the multiple entries from the plurality of entries by the user.

The editor 500 can be any kind of hierarchical rich text editor, which contains many types of objects, such as headings, tables, graphics, hyperlinks, OLE objects, drawing objects, etc. The common-used editors include word processing editor like Microsoft Word, spreadsheet editor like Microsoft Excel, and presentation editor like Microsoft PowerPoint. The object is a relatively independent document element which can realize a special function and have its own properties and behaviors.

When a document is opened in the editor 500, it contains a plurality of selectable objects, such as charts, rectangles, ellipses, lines, etc. and these objects exist in different locations in the document respectively. In FIG. 3, signs 1001-1007 represent the selectable objects in the document respectively. Each selectable object in the document is provided to the navigation window 302 to be presented as an entry.

Further, the navigation window 302 includes a list control, which presents the plurality of selectable objects. Moreover, the plurality of selectable objects can be arranged in name or location. It should be understood that the plurality of selectable objects in the list control can be arranged in other order.

Preferably, the apparatus 300 for enabling a user to select multiple objects in a document further includes: a categorizing unit 304, which categorizes the plurality of selectable objects. In this case, the navigation window 302 includes a tree-view control for presenting the plurality of selectable objects in a tree structure. In the tree structure, each category is a branch node of the tree structure and each object is a leaf node.

The categorizing unit 304 can categorize the plurality of selectable objects based on the type of the object, for example, charts, drawing objects etc., or based on the location of the object, for example, the first five pages, or based on a user-defined category.

Moreover, the categorizing unit 304 can categorize the plurality of selectable objects many times, i.e. categorize with more than one criterion, so that the tree-view control has a multi-layer tree structure. For example, the categorizing unit 304 categorizes the plurality of selectable objects primarily based on the user-defined category, and then categorizes the primarily categorized objects based on the type of the object. Thus the tree-view control has a three-layer tree structure, wherein the first and second layers (branch node) are the user-defined category and the type category, and the third layer (leaf node) is the selectable object.

In this embodiment, the categorizing unit 304 categorizes the plurality of selectable objects only based on the type of the object. So as shown in FIG. 3, the tree structure has two layers, wherein the first layer (branch node) is the type of the object, such as Graphic, Drawing Object, Chart, etc., and the second layer (leaf node) is each of the selectable objects, as shown by signs 1101-1107 which corresponds to the objects 1001-1007 in the editor 500 respectively.

In this embodiment, preferably, the selectable objects are presented in the tree-view control. It can be understood for the persons skilled in the art that the above mentioned list control and tree-view control are illustrative and the control in other forms can also be utilized.

Further, the apparatus 300 for enabling a user to select multiple objects in a document can include: an extracting unit 301, which is used to extract the plurality of selectable objects from the document and provide the selectable objects to the navigation window 302.

In the navigation window 302, each entry corresponding to each selectable object includes: a control having a function of indicating the selection state of the entry, preferably for example a Check Box, which allows the user to select. The Check Box provides the possibility for the user to select the entries, and the check or uncheck of the Check Box can be used to indicate the selection state of each entry, i.e. "selected" or "unselected".

In this embodiment, the user's operation on the entry in the navigation window 302 is performed with keyboard. That is, the user uses navigation keys and a selection key to traverse each entry and select the Check Box of each entry. The navigation keys are the keys with which the user can move the operation focus among the respective entries, for example, ARROW keys. The selection key is the key with which the user can switch the selection state of the entry, for example, SPACE key. Of course, the persons skilled in the art would know that other keys can also be used as the navigation keys and the selection key.

Further, in the case of presenting the selectable objects in the tree structure, each branch node of the tree structure includes a control having a function of indicating the selection states of all entries in the branch node, for example a Check Box, for allowing the user to select and record the selection states of all entries in the branch node. Thus, the check or uncheck of the Check Box can be used to indicate the selection states of all entries in each branch node, i.e. "selected" or "unselected". When the Check Box of a branch node is checked, it is equivalent that all entries in the branch node are selected.

In practice, the user uses the navigation keys to move the operation focus among the entries and/or the branch nodes. When the operation focus is moved to the user desired entry or branch node, the user presses the selection key and the Check Box of the entry or branch node is checked. So the selection state(s) of the entry or all entries in the branch node is shown as "selected". Further, if the user wants to cancel the selected entry or branch node, he/she can use the navigation keys to move the operation focus to the entry or branch node, and then press the selection key. Thus the Check Box of the entry or branch node is changed to be unchecked and the selection state(s) of the entry or all entries in the branch node is changed to "unselected". When the user has selected multiple entries from the plurality of entries, the selecting unit 303 selects multiple objects corresponding to the selected multiple entries in the editor 500 based on the selection of the user. For the entries selected by the user, the selecting unit 303 selects the objects corresponding to the entries in the editor 500. Further, for the entries canceled by the user, the selecting unit 303 removes the selection of the objects.

It can be seen from the above that the apparatus for enabling a user to select multiple objects in a document can provide the continuous or non-continuous selection of the multiple objects in the document by using the keyboard, thereby facilitating the user, especially the low-vision user or the blind user, to operate and the operations are simple.

Further, the apparatus 300 for enabling a user to select multiple objects in a document also includes: an updating unit 305, which is used to update the plurality of entries in the navigation window 302 when at least one of the plurality of selectable objects in the document is modified or deleted in the editor 500.

It can be seen from the above that the apparatus 300 for enabling a user to select multiple objects in a document can update the entries associated with the objects presented in the navigation window 302 in real time according to the change of the selectable objects.

The apparatus 300 for enabling a user to select multiple objects in a document and the components thereof can be implemented by hardware circuit such as Very Large Scale integrated Circuit or gate array, semiconductor such as logic chips and transistors, or the programmable hardware device such as field programmable gate array, programmable logic device, and by software executed by various types of processors, and by the combination of the above hardware circuit and the software.

Figure 4:
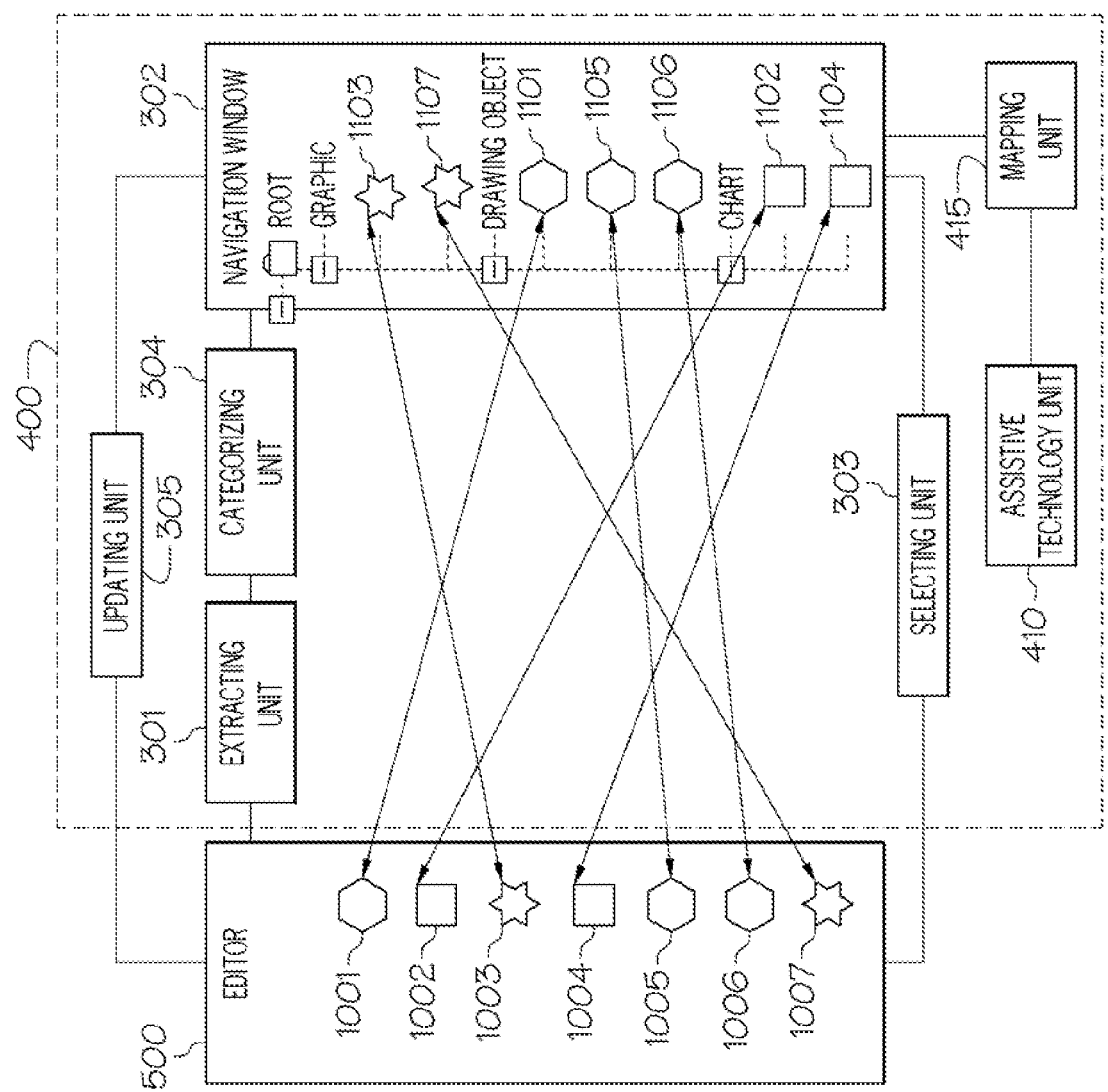
FIG. 4 is a schematic block diagram of another apparatus for editing an electronic document which includes an editor and an apparatus for enabling a user to select multiple objects in a document according to another embodiment of the present invention.

FIG. 4 is a schematic block diagram of another apparatus for editing an electronic document which includes an apparatus 400 for enabling a user to select multiple objects in a document according to another embodiment of the present invention and the editor 500, wherein the same reference numerals are used in the portions that are the same as FIG. 3 and the description of the same portions are omitted properly.

Comparing with the embodiment as shown in FIG. 3, the apparatus 400 for enabling a user to select multiple objects in a document further includes an assistive technology unit 410, which provides the related information and the selection state of the operated object to the user in a manner provided by the Assistive Technology (AT) based on the user's operation in the navigation window 302. The Assistive Technology (AT) is a technology for facilitating disabled users, such as blind users, low-vision users and so on, to access, which is known to the persons skilled in the art.

Each entry corresponding to each selectable object in the navigation window 302 also includes the related information of the selectable object in order to provide the object's related information. The related information of the object is the information created by the editor 500 during the edit of the electronic document or inputted by the user. In this embodiment, the related information is the accessibility information of the object, including Name, Role, Description, State, and Location. Since the accessibility information has been described in the above, its explanation is omitted here. To comply with the software accessibility, the editor 500 is accessible and each object has the accessibility information which is provided to the user in the manner provided by the Assistive Technology by the assistive technology unit 410.

In the case that the related information is the accessibility information, if the selectable objects are presented in the tree-view control in the navigation window 302 and are categorized only based on the type of the object, the tree structure has two layers, wherein the first layer (branch node) is the type of the object which corresponds to the Role property in the accessibility information of the objects and the second layer (leaf node) is the selectable object. The presented name of each leaf node corresponds to the Name property in the accessibility information of the object. In the property information of the leaf node, the description corresponds to the Description property and the Location property in the accessibility information of the object, and the state corresponds to the State property in the accessibility information of the object.

Specifically, the user's operation in the navigation window 302 is to operate the navigation keys to traverse every entry or branch node in the navigation window 302. If the operation focus is moved to an entry or a branch node by using the navigation keys, the assistive technology unit 410 provides the user with the related information and the selection state(s) of the object(s) of the entry or all entries in the branch node.

By this operation, the disabled user can know the related information and the current selection state(s) of the object(s) of the entry or all entries in the branch node where the operation focus locates, so that the user can determine whether the entry or the branch node is the user desired entry or branch node.

When the user's operation in the navigation window 302 is to operate the selection key to select an entry or a branch node, if one entry or branch node is selected, the assistive technology unit 410 provides the user with the related information and the selection state(s) of the object(s) of the entry or all entries in the branch node. By this operation, the disabled user can know the related information and the selection state(s) of the object(s) of the entry or of all entries in the branch node, so that the user can determine whether the correct, entry or branch node is selected.

Generally, when the user wants to know all the currently selected objects, the user must use the navigation keys to traverse all the entries in the navigation window 302 and obtain the related information and the selection states of all objects by the assistive technology unit 410. Thus, the assistive technology unit 410 must perform operations no matter whether it is the selected object, winch causes low efficiency. In the case that the selected entries and the unselected entries are intersected, it is more difficult for the user to know all the currently selected objects.

To solve the problem, in the embodiment, the assistive technology unit 420 further provides the user with the related information and/or the selection states of all the currently selected objects in response to the operation of the user, wherein the user's operation is to operate a pre-defined information function key. When the information function key is pressed, the assistive technology unit 410 provides the user with the related information and/or the selection states of all the currently selected objects.

Further, the related information and/or the selection states of all the currently selected objects can be presented in a Status Bar in the navigation window 302. In this case, the assistive technology unit 410 can directly access the Status Bar to provide the information in the Status Bar to the user. Preferably, only the name of the object is displayed in the Status Bar. In this case, all names are formatted into a character string.

In the embodiment, the related information of the object is the accessibility information of the object. As shown in the above, the related information of the object can also include other information besides the accessibility information of the object. And in this case, the apparatus 400 for enabling a user to select multiple objects in a document also includes a mapping unit 415, which maps the related information of the object to the accessibility information of the object to provide to the assistive technology unit 410.

The apparatus 400 for enabling a user to select multiple objects in a document and the components thereof can be implemented by hardware circuit such as Very Large Scale Integrated Circuit or gate array, semiconductor such as logic chips and transistors, or the programmable hardware device such as field programmable gate array, programmable logic device, and by software executed by various types of processors, and by the combination of the above hardware circuit and the software.

It can be seen from the above that the apparatus for enabling a user to select multiple objects in a document combines the assistive technology unit so that the related information of the objects can be provided to the disabled user and the efficiency of the apparatus for selecting multiple objects in a document with keyboard is improved. For example, the disabled user can locate the objects and track the states more easily and promptly. In addition, the embodiment is also suitable for the case that the related information of the object includes other information but the accessibility information of the object.

The present invention also provides a computer program product containing computer useable program codes for implementing all the above methods and a computer usable storage medium that tangibly embodies the program codes.

Figure 5A:
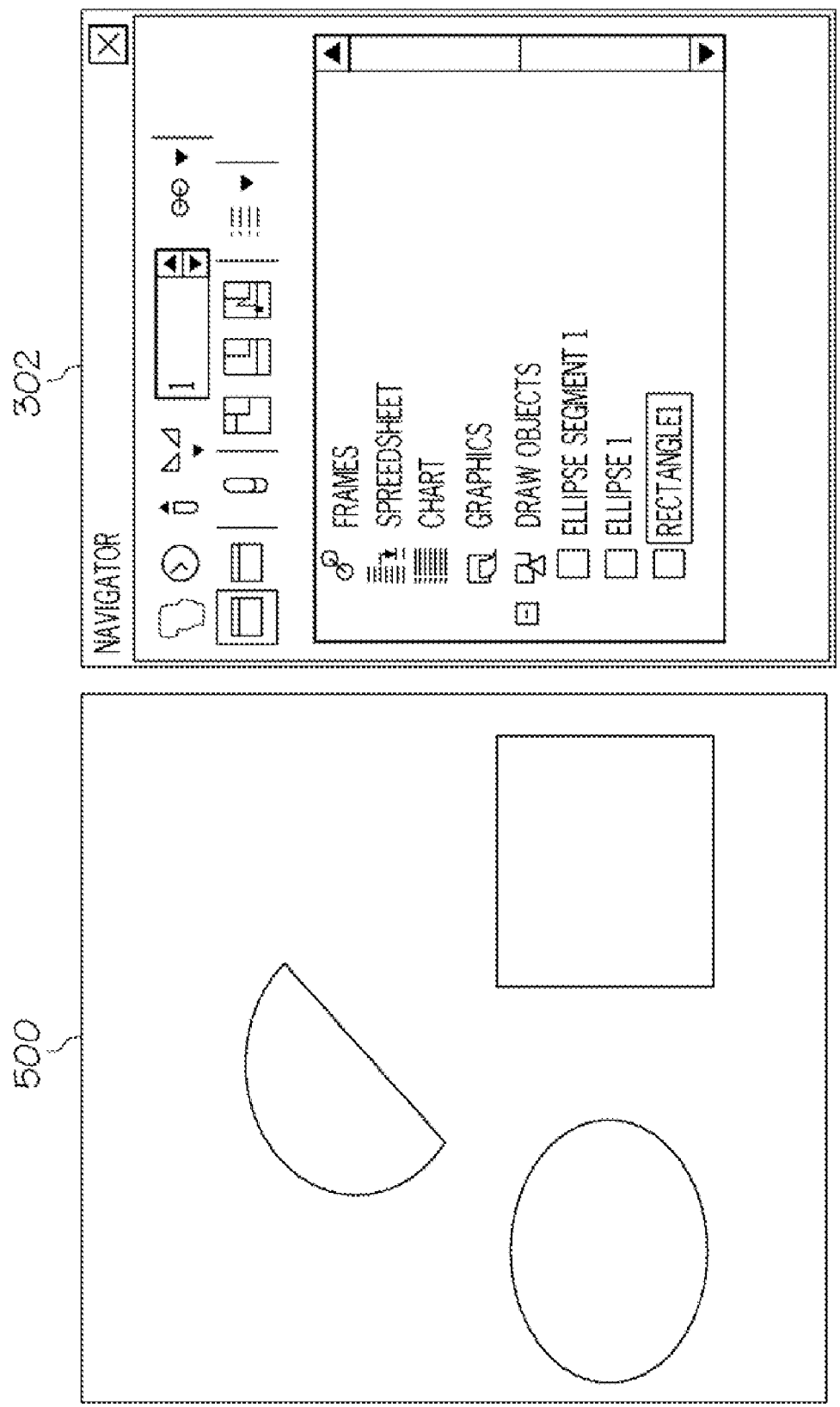
FIGS. 5a-5e are schematic diagrams of selecting multiple objects in a document by using an embodiment of the present invention.

FIGS. 5a-5e are schematic diagrams of selecting multiple objects in a document by using an embodiment of the present invention. As shown in FIG. 5a, there are three objects in the editor 500, which are a rectangle, an ellipse and an ellipse segment respectively. At present, all of them are not selected. In the navigation window 302, the related information of the objects is presented in the tree structure. The branch node is the type of the object and the leaf node only presents the name of the object. It can be seen that the names of the objects in the editor 500, "Rectangle1," "Ellipse1" and "Ellipse Segment1" are presented on the leaf nodes of the type "Drawing objects" and a Check Box is provided in front of the name of each object. At this time, all the states of the three Cheek Boxes are "unselected."

Figure 5B:
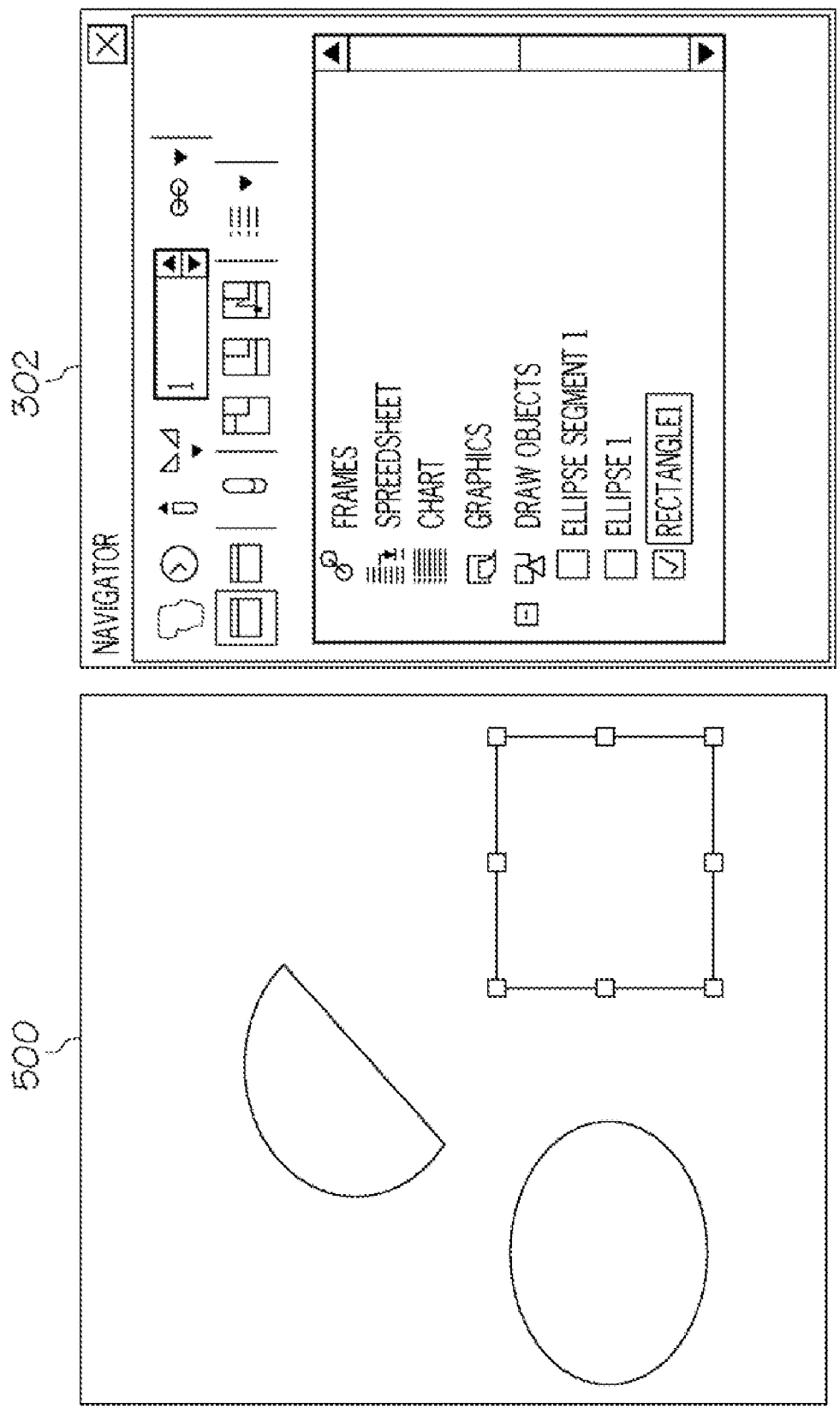

The user begins to select the object. If the user wants to select the rectangle, the user moves the operation focus to the entry "Rectangle1" in the navigation window 302 by using the navigation keys, for example ARROW keys, and then presses the selection key, for example SPACE key. Thus, the Check Box of "Rectangle1" is checked and then the rectangle in the editor 500 is also selected. A mark indicating selected is shown on the rectangle, as shown in FIG. 5b.

Figure 5C:
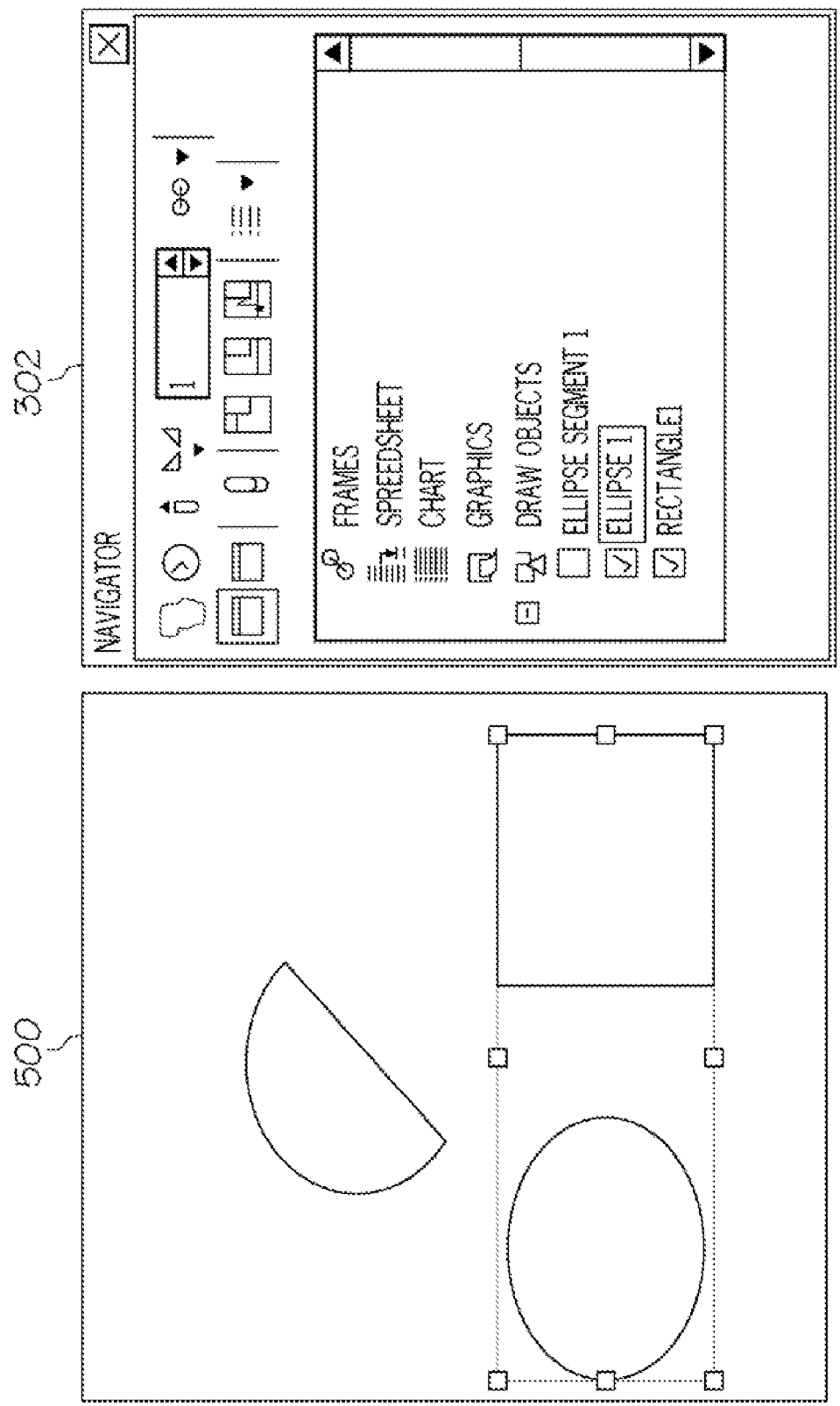

If the user wants to select another object, for example the ellipse, similarly, the user moves the operation focus to the entry "Ellipse1" in the navigation window 302 by using the ARROW keys and then presses the SPACE key to check the Check Box of "Ellipse1." Then, the ellipse is selected in the editor 500 and the selected mark is shown on the two objects simultaneously, the rectangle and the ellipse, as shown in FIG. 5c.

Figure 5D:
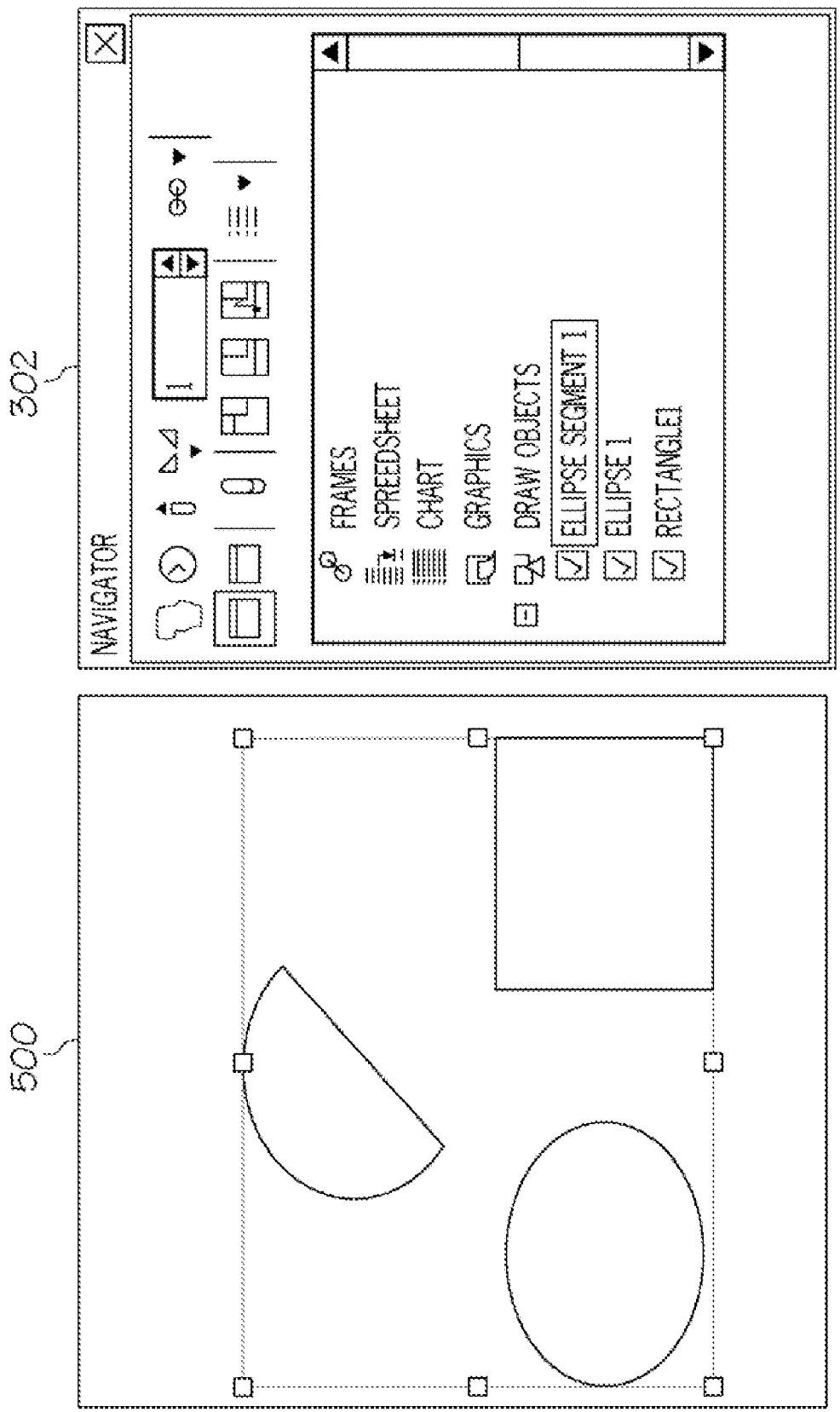

The ellipse segment can also be selected in the editor 500 through the same operation as the above operations of selecting the rectangle and the ellipse, and the selected mark can be shown on the three objects simultaneously, the rectangle, the ellipse and the ellipse segment, as shown in FIG. 5d.

Figure 5E:
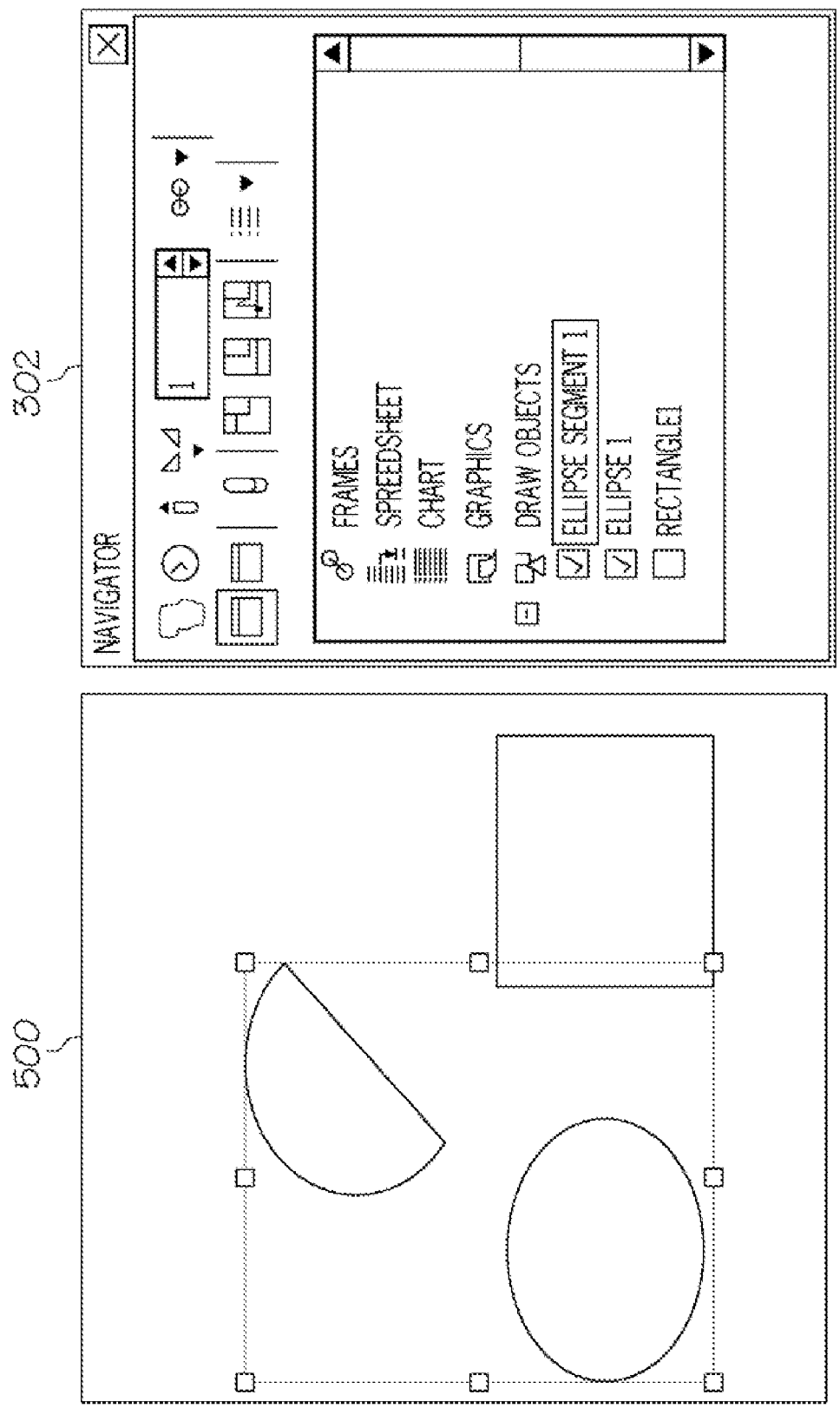

If the user wants to cancel the selection of the selected object, the user moves the operation focus to the entry which is to be canceled, for example the entry "Rectangle1", in the navigation window 302 by using the ARROW keys and then presses the SPACE key. The state of the Check Box of "Rectangle1" is changed to "unselected" Then the rectangle is unselected in the editor 500 and the selected mark on the rectangle is removed, as shown in FIG. 5e.

Figure 6:
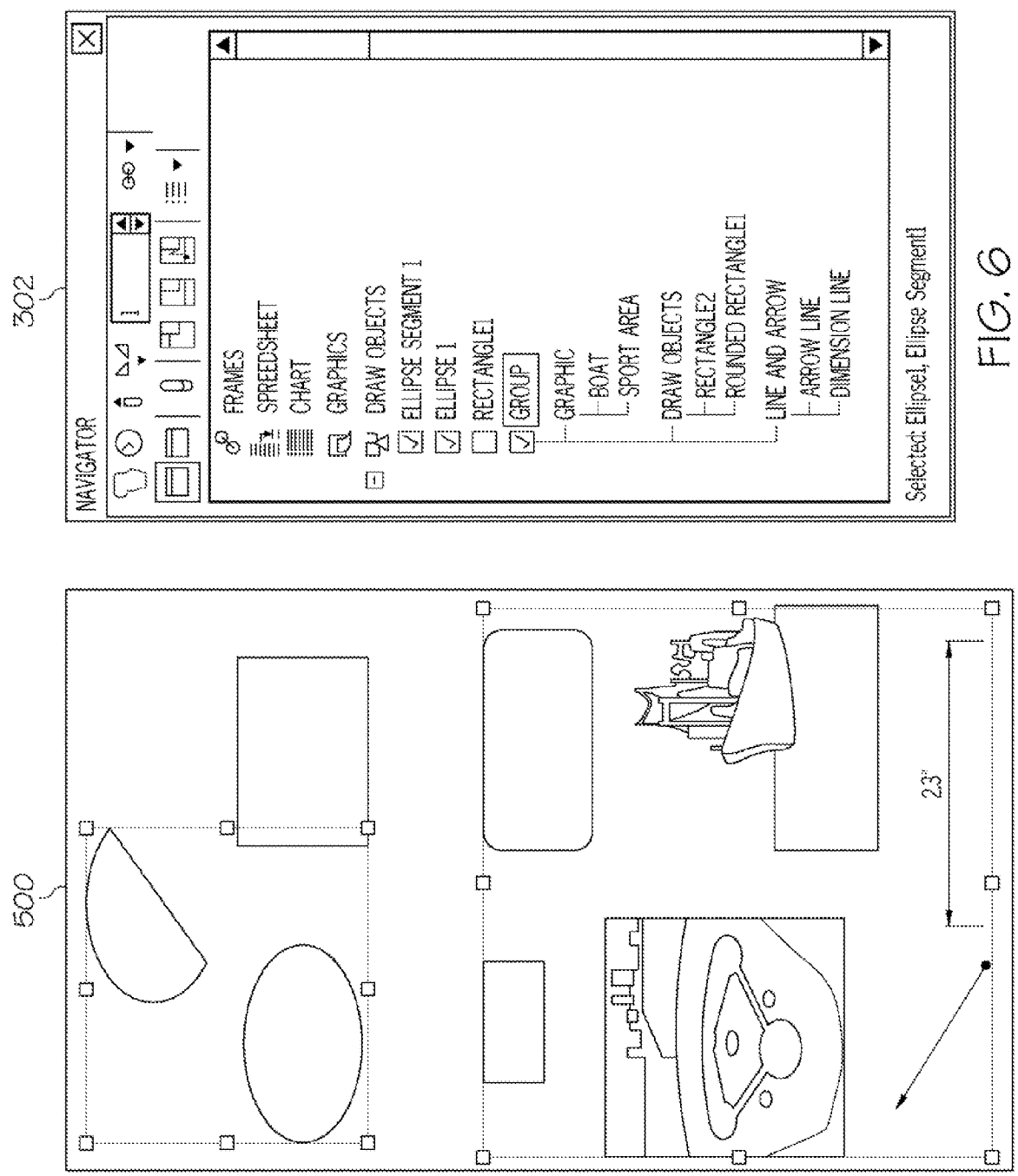
FIG. 6 is an illustrative diagram of presenting the selectable objects in a multi-layer tree structure in one embodiment of the present invention.

FIG. 6 is a schematic diagram of presenting the selectable objects in the multi-layer tree structure in one embodiment of the present invention. As shown in FIG. 6, there are 9 objects in the editor 500. When these objects are presented in the tree structure in the navigation window 302, the objects "Ellipse Segment1," "Ellipse1" and "Rectangle1" are categorized into the type "Drawing Objects" and the other objects are categorized into the group "Group." The objects in the "Group" are further categorized based on the type, wherein the objects "Boat" and "Sport Area" belong to the type "Graphic", the objects "Rectangle2" and "Rounded Rectangle1" belong to the type "Drawing Objects" and the objects "Arrow Line" and "Dimension Line" belong to the type "Line and Arrow". In this way, when the "Group" is selected, all objects belonging to the "Group" are selected.

Although the method and apparatus for enabling a user to select multiple objects in a document of the present invention are described in detail with the combination of the embodiments, it should be understood that persons skilled in the art can modify the above embodiments in various way without departing from the spirit and scope of the present invention.

What is claimed is:

1. A computer implemented method for enabling a user to select multiple objects in a document that is opened in an editor and contains a plurality of selectable objects, said method comprising:

presenting each of the plurality of selectable objects in the document opened in the editor as an entry of a plurality of entries in a separate window;

allowing the user to select multiple entries from the plurality of entries; and selecting multiple objects in the document opened in the editor corresponding to the selected multiple entries based on the multiple entries selected by the user.

2. The method according to claim 1, further comprising extracting the plurality of selectable objects from the document.

3. The method according to claim 1, wherein the step of presenting each of the plurality of selectable objects as an entry in a separate window comprises presenting the plurality of selectable objects as a list.

4. The method according to claim 3, wherein the selectable objects are arranged by name or location.

5. The method according to claim 1, wherein the step of presenting each of the plurality of selectable objects as an entry in a separate window comprises:

categorizing the plurality of selectable objects; and presenting the plurality of selectable objects as a tree structure, wherein each category is a branch node of the tree structure and each object is a leaf node.

6. The method according to claim 5, wherein the category is a multi-layer structure.

7. The method according to claim 1, wherein the step of allowing the user to select multiple entries from the plurality of entries comprises:

setting a control having a function of indicating a selection state for each of the plurality of entries; and allowing the user to use navigation keys and a selection key to traverse each of the plurality of entries and select the control of each of the plurality of entries.

8. The method according to claim 7, wherein the control of each of the plurality of entries is a check box.

9. The method according to claim 7, wherein the step of allowing the user to select multiple entries from the plurality of entries further comprises:

setting, for each branch node of the tree structure, a control having a function of indicating the selection state of all entries in the branch node; and allowing the user to use the navigation keys and the selection key to traverse each branch node and select the control of each branch node.

10. The method according to claim 9, wherein the control of each branch node is a check box.

11. The method according to claim 1, wherein each of the plurality of entries further includes related information of the corresponding selectable object.

12. The method according to claim 11, wherein the related information of the object is accessibility information of the object.

13. The method according to claim 1, further comprising: based on a user's operation on any one of the plurality of entries, calling an assistive technology application to provide the user with the related information and the selection state of the operated object.

14. The method according to claim 13, wherein the user's operation includes traverse and/or selection.

15. The method according to claim 13, further comprising: calling the assistive technology application to provide the user with the related information and/or the selection states of all the currently selected objects.

16. The method according to claim 15, further comprising: presenting the related information and/or the selection states of all the currently selected objects in a Status Bar in the window.

17. The method according to claim 13, further comprising: mapping the related information of the object to the accessibility information before calling the assistive technology application.

18. The method according to claim 17, wherein the accessibility information of the object includes at least: Name, Role, Description, State and Location.

19. The method according to claim 1, wherein the user's operation is performed with a keyboard.

20. The method according to claim 1, further comprising: updating the plurality of entries in the window when at least one of the plurality of selectable objects is modified or deleted in the editor.

21. The method according to claim 1, further comprising: performing the presenting step when creating at least one selectable object in the editor.

22. Apparatus for enabling a user to select multiple objects in a document that is opened in an editor and contains a plurality of selectable objects, said apparatus comprising:

a navigation window, for presenting each of the plurality of selectable objects in the document opened in the editor as an entry of a plurality of entries and allowing the user to select multiple entries from the plurality of entries; and a selecting unit, for selecting multiple objects in the document opened in the editor corresponding to the selected multiple entries based on the selection of the multiple entries from the plurality of entries by the user.

23. A computer program product for enabling a user to select multiple objects in a document that is opened in an editor and contains a plurality of selectable objects, the computer program product comprising a computer usable medium having computer usable program code tangibly embodied therewith, the computer usable medium comprising:

computer usable program code configured to present each of the plurality of selectable objects in the document opened in the editor as an entry of a plurality of entries in a separate window;

computer usable program code configured to allow the user to select multiple entries from the plurality of entries; and computer usable program code configured to select multiple objects in the document opened in the editor corresponding to the selected multiple entries based on the multiple entries selected by the user.

* * * * *